United States Patent
Heubach et al.

(10) Patent No.: US 7,569,106 B2
(45) Date of Patent: Aug. 4, 2009

(54) METHOD FOR PRODUCING β COPPER PHTHALOCYANINE BLUE PIGMENTS AND USE THEREOF

(75) Inventors: Rainer Heubach, Grossgmain (AT); Dieter Lieske, Vienenburg (DE)

(73) Assignee: Colour Ltd., Hamilton (BM)

( * ) Notice: Subject to any disclaimer, the term of this patent is extended or adjusted under 35 U.S.C. 154(b) by 0 days.

(21) Appl. No.: 11/629,946

(22) PCT Filed: Jun. 16, 2005

(86) PCT No.: PCT/EP2005/006490

§ 371 (c)(1),
(2), (4) Date: Sep. 10, 2007

(87) PCT Pub. No.: WO2005/123844

PCT Pub. Date: Dec. 29, 2005

(65) Prior Publication Data

US 2008/0127861 A1   Jun. 5, 2008

(30) Foreign Application Priority Data

Jun. 16, 2004  (DE) ................ 10 2004 028 791

(51) Int. Cl.
C09B 67/04 (2006.01)
C09B 47/04 (2006.01)

(52) U.S. Cl. ............... 106/412; 106/410; 106/411; 106/413; 540/122; 540/140; 540/141

(58) Field of Classification Search ............ 106/410, 106/411, 412, 413; 540/122, 140, 141
See application file for complete search history.

(56) References Cited

U.S. PATENT DOCUMENTS

| | | | |
|---|---|---|---|
| 3,849,150 A | 11/1974 | Schrempp et al. | |
| 4,298,526 A | 11/1981 | Sappok et al. | |
| 5,175,282 A | 12/1992 | Roth et al. | |
| 5,281,268 A | 1/1994 | Ide et al. | |
| 5,296,033 A * | 3/1994 | Dietz et al. | 106/412 |
| 5,492,563 A * | 2/1996 | Urban | 106/412 |
| 5,859,237 A * | 1/1999 | Noguchi et al. | 540/144 |
| 7,101,428 B2 * | 9/2006 | He et al. | 106/495 |
| 2003/0127023 A1 | 7/2003 | Grandidier et al. | |

FOREIGN PATENT DOCUMENTS

| | | |
|---|---|---|
| EP | 101163 A2 * | 2/1984 |
| EP | 0 350 687 | 1/1990 |
| EP | 0 702 062 | 3/1996 |
| EP | 0 764 701 | 3/1997 |
| EP | 0 774 494 | 5/1997 |
| EP | 0 783 029 | 9/1997 |
| GB | 2 051 108 | 1/1981 |
| JP | 11060982 A * | 3/1999 |
| WO | WO 99/54410 | 10/1999 |
| WO | WO 2004/011558 | 2/2004 |

OTHER PUBLICATIONS

International Preliminary Report on Patentability—Intl. Application No. PCT/EP2005/006490, Intl. Filing Date Jun. 16, 2005.

* cited by examiner

*Primary Examiner*—Anthony J Green
(74) *Attorney, Agent, or Firm*—Fay Sharpe LLP; Karl W. Hauber

(57) ABSTRACT

The invention relates to a method for producing an aqueous suspension of pure-phase β-copper phtalocyanine blue pigment using an agitator ball mill. According to said method: a) in a preparatory step, a phthalocyanine crude blue is suspended by means of a dissolver in an aqueous medium, said aqueous medium containing in particular lipophilic substances, which are similar to binding agents and are compatible with the final application medium and crystalline-phase controlling and/or pigment-surface conditioning compounds; b) said aqueous suspension of the phthalocyanine crude blue is ground in an agitator ball mill to form a suspension of a β-phtalocyanine blue pigment. The aqueous suspension thus obtained is characterized in that it contains a high-grade β-phtalocyanine blue pigment for producing a conditioned β-phtalocyanine blue pigment. The advantage is that said suspension can also be directly converted into a colour concentrate, in particular by means of a flushing and kneading method.

33 Claims, No Drawings

METHOD FOR PRODUCING β COPPER PHTHALOCYANINE BLUE PIGMENTS AND USE THEREOF

The invention relates to a method for producing aqueous suspensions of β-copper phthalocyanine blue pigments by wet grinding of crude blue pigments together with different additives by means of an agitator ball mill, direct isolation from the mill base (or grinding suspension) of the already conditioned color substances suitable for pigmentation of systems to be colored, as well as the direct conversion of the aqueous suspension into lipophile gloss-paint and printing ink concentrates, primarily for offset printing.

In a generally customary finishing procedure of polycyclic organic pigments (including phthalocyanine pigments), the coarse grained raw material (crude) is ground dry for purposes of conversion into a pigment—if appropriate—in the presence of grinding adjuvants, first in a ball- or vibratory mill or other comminuting devices to a primary particle size of 100-10 nanometers (nm) suitable for charge as pigment, whereby the resulting micronized particles agglomerate as a result of Van-der-Waals- and electrostatic forces.

The agglomerated particles are des-agglomerated in a subsequent process step by treatment with large amounts of aromatic solvents or alcohols or mixtures of the aforementioned solvents with water.

This is done in that the pre-milled powder receives subsequent heat treatment in an agitator reactor in the presence of adequate fluid phase volume and, if required, additional substances. While the pigment suspension is heated and stirred under reflux conditions, the agglomerates are decompounded and the crystallites transformed into the desired structure.

The addition of water makes it possible to remove the solvent by azeotropic distillation and to transform the pigment into a purely aqueous suspension. Such slurry is subsequently conveyed into a filter press, the mother liquor is separated and residues of impurities are washed out of the remaining press cake. The pure press cake is now suitable to being transformed into e.g. a blue color concentrate by a so-called "flush process" or to isolate from same a powder pigment by drying and milling.

Based on the two-stage transformation of the crude blue into a high-quality pigment in accordance with the current state of the art, the above described method is economically disadvantageous and expensive.

In addition—in case of flush production for printing ink manufacture—employment of a triple-roll-mill for comminuting oversize particles is absolutely mandatory as a safety measure, and, at the same time, degasification of the preparation is ensured.

The "salt grinding method" produces a colorant by traditional manner in that the crude is reduced in size in the presence of a large amount of micronized salt and glycols, if needed under addition of additives by mechanical treatment in a chaser mill or in a kneader unit.

Following said grinding step, the entire mass is reduced to slime in an aqueous medium. The salts and glycols dissolve and can be separated in a filter press from the pre-pigment by filtration and subsequent washing. As a rule, this step is followed by thermal after-treatment of the obtained press cake in solvent systems. The pigment press cake which is obtained after removal of solvents by distillation and/or filtration can in turn be transformed by "flushing" in an appropriate varnish into a color concentrate or be employed as basis for the production of β-phthalocyanine pigment powders.

This established method also requires two pigmentation steps and the employment of large amounts of economically non-reclaimable salts and glycols. This represents a huge economical and ecological drawback.

Extensive state of the art is available for the production of pigments suitable for systems on lipophile basis, as documented by the printed material mentioned below. This involves the finishing of organic pigments, in particular of poly-cyclical pigments, specifically of phthalocyanine-, quinacridone-, perinone-, anthraquinone- and dioxazine pigments. Processes dealing with this method are apparent, for example, from U.S. Pat. No 3,849,150, U.S. Pat. No 5,944,887, EP-A-0 087 713 as well as EP 350 687.

The grinding-/re-crystallization-/conditioning method, and the "salt grinding method" with ensuing crystal phase-directing conditioning is apparent, for example, from U.S. Pat. No. 4,298,526 or corresponding DE 28 51 752. The employed solvents preferably comprising aromatic or glycol ethers are generally acknowledged by persons skilled in the art to play a key role in adjustment of various energy minima to form ordered solid phases (crystallites), thereby selectively controlling formation of special modifications of polymorphous substances. At the same time, these substances jointly with other additives and the selected chronological temperature variation, control the growth and within certain limitations also the shape of the pigmentary target substances. This is extensively described in the literature, for example (Smith, H. M.: "High Performance Pigments", Weinheim: VCH-Wiley 2002, Pages 118-122, 286-289; Herbst, W., Hunger, K.: "Industrial Organic Pigments", Weinheim: VCH-Wiley 1993, Pages 16-18, 41-43.)

None of the methods according to the state of the art is devoid of drawbacks, in particular with regard to the large volume of environmentally polluting side products and residues as well as from the aspect of economic drawbacks.

All cited references merely describe methods which require tedious, time- and material-intensive, loss-producing finishing treatments, and which sometimes cannot be undertaken without risks, in particular from an ecological aspect and with regard to safety.

As a task, it was therefore the object of the invention described below to optimize the initially described method for the production of β-copper phthalocyanines in such manner that the resulting products satisfy the quality requirements of the customers and that the technical expenditure of production is reduced at the same time.

Said task is solved according to the invention with the initially described method in that a) A phthalocyanine crude blue is suspended in an aqueous medium by means of dissolvers and b) The aqueous suspension of the β-phthalocyanine crude blue is ground and conditioned in an agitator ball mill into a suspension of a β-phthalocyanine blue pigment. It is preferred in this case that the addressed aqueous medium in step a) contain binding agent-like substances which are compatible with the final application medium, as well as crystal-phase-directing and/or pigment-surface conditioning compounds. It is preferable that the substances or compounds in the aqueous medium contain individually or totally not more than 0.1 to 25% by weight, in particular 1-10% by weight.

Accordingly, the inventive method for obtaining a suspension of β-phthalocyanine blue pigment comprises two easily executable steps a) and b), in order to obtain in particular a copper phthalocyanine blue pigment in β-modification (C.I. $^{(R)}$ P.B.15:3). It is merely necessary to initially integrate for example into an aqueous medium in step a) a binding agent resin, a long-chain carboxylic acid, a printing ink oil and an aromatic compound and to suspend the additionally therein contained phthalocyanine crude blue ("crude") by means of a dissolver.

Within the scope of a genuinely skilled technical proceeding, it is possible to calculate the amount of the above named materials employed in the aqueous medium in such manner that in the subsequent step b) the obtained aqueous suspension of the phthalocyanine crude blue is formed in such manner that it can be milled without any problems in an agitator ball mill into the desired suspension of a β-phthalocyanine blue pigment.

Different resins and resin mixtures as well can be employed as binding agent resins. To name as examples: thermoplastics, partially cross-linked resins with partial duroplastic character, in particular colophonium resins, hydrated, esterified and phenol- or maleic acid-modified colophonium resins as well as partially cross-linked derivatives of above named products via substitution or esterification with polyhydric alcohols, including mixtures of same.

In addition, hydrocarbon-based and alkyd resins may be employed. Preference is given to the following resins: aromatic hydrocarbon resins, alkyd resins, pentaerythritol-rosin esters, colophonium resins, phenol-modified rosin esters, maleic-modified rosin esters, ketone resins, aldehyde resins, melamine formaldehyde-condensation resins and acrylic resins. Because of reasons of compatibility, it is preferred to already introduce at this stage a resin system targeted for compatibility with the envisaged future application field.

With respect to the crystal-phase directing aromatic compounds, these involve in particular—including also alkylated and/or halogenated—benzenes and naphthalenes as well as benzyl alcohol, diphenylmethane, benzhydrol, benzoic acid, phenols, stilbene, acenaphthene, anthracene, furane, 1,8-naphthalimide, benzil (diphenylglyoxal), diphenylcarbinol, 1-methylnaphthalene, phthalic anhydride, benzophenone and/or dibenzyl ether. Basically, such aromatic compounds are "β-directing" if they can be dissolved or at least partially dissolved in the re-crystallizing medium.

If one speaks within the scope of the invention of a "long-chained carboxylic acid" then this characteristic essentially orients itself on the circumstance that while it is to present acid character, it has in particular the effect of functioning with a hydrophilic group on the one hand and a longer hydrophobic alkyl-chain on the other hand, aside from the solvents and dispersing agents named below, as quasi binding link between the organic resins, oils and color substance particles on the one hand and the aqueous medium on the other hand. By way of rough guide line it can be stated that the long-chained carboxylic acid should comprise approximately 10 to 19 carbon atoms and may also contain double bonds. Preferential use is made of stearic acid, palmitic acid, oleic acid, dodecanoic acid, linolenic acid, linoleic and/or myristic acid.

In addition, traditional printing ink oil is employed. This involves, aside from vegetable oils, in particular products which are obtained from refined mineral oil products. However, chemically modified vegetable oils are used as well. In this case, the mineral oils produced by Haltermann (designated "PKW" and "PKWF") are used specifically and also (chemically modified) vegetable oils.

Within the scope of the invention, the aromatic compound employed in step a) has the character of a β-directing compound in order to transform—combined with other additives—the starting material into the desired final product of β-type copper phthalocyanine, having additional desirable properties.

In order to increase the wettability or compatibility of non-water soluble, reagglomeration-preventing, organic resins, oils and aromatic compounds, it is preferred that in step a) or after completion of step a) an addition be made of a dispersion auxiliary and/or of all polar solvents which have the function of a solutizer. The following have proven themselves as particularly beneficial: cyclohexanol, dioxane, butyl glycol, amyl alcohol, dodecyl alcohol, acetone, 2-methyl-3-butene-2-ol, dimethylformamide, dimethylsulfoxide, 3-methyl-1-butanol, tetrahydrofurane and/or polyethyleneglycol.

In general, the amount of added substance should be approximately 0.1 to 20% by weight of the aqueous medium. Particularly preferred is a range of 0.5 to 10% by weight. In individual instances it is of benefit to additionally employ a base in step a) with the following, in particular, being utilized: potassium-hydroxide, sodium-hydroxide, aqueous liquid ammonia, monoethanolamine or triethanolamine. It is obvious that said list does not constitute any limitation, but is merely given as an example. Use of the base causes partial dissolution of the long-chained carboxylic acids and of the colophonium- and acrylic resins. As a rule, an amount of approximately 0.3 to 2.0% by weight, in particular of 0.4 to 1.4% by weight should produce the indicated effect.

Taking into consideration the above explanations relative to the core of steps a) and b), the achievement lies especially in the circumstance that the desired color characteristic as well as important application-engineering properties of the pigments remain preserved. The subsequently specified final compositions are given as examples and merely represent a guideline, with facultative optimizing components also being included: Water (condensed) approximately 40 to 60% by weight, base, approximately 0.3 to 2.0% by weight, dispersion auxiliaries (facultative) approximately 0.1 to 0.9% by weight, binding agent resin approximately 1.0 to 5.0% by weight, long-chained carboxylic acid approximately 1.0 to 5.0% by weight, printing ink oil approximately 0.7 to 7.0% by weight, aromatic compound as β-directing means approximately 0.1 to 8.0% by weight, polar organic solvent (facultative) approximately 0.1 to 20% by weight and copper phthalocyanine crude blue (crude) approximately 15 to 55% by weight.

Following addition of the resin, the long-chained carboxylic acid, the printing ink oil and the β-directing aromatic compound, stirring is maintained for approximately 40 minutes, preferably approximately 10 minutes after charging the crude blue.

A basic recipe was already provided earlier, which is of value in practical application. In principle it is deemed advantageous if the aqueous suspension during step a) approximately contains 15 to 55% by weight of phthalocyanine crude blue pigment, in particular approximately 30 to 50% by weight and approximately 40 to 60% by weight, in particular approximately 45 to 55% by weight of water, with the difference to 100% being attributed to the addressed remaining components. For the optionally included additives in form of a base and/or a dispersion auxiliary, it is preferred that the aqueous medium in step a) contains the base in an amount of approximately 0.3% by weight, in particular approximately 0.4% by weight, and/or the dispersion auxiliary in an amount of approximately 0.1 to 0.9, in particular approximately 0.2 to 0.6% by weight.

Independent of the above indicated preferred basic procedure, it should be pointed out with respect to step a) regarding the different required components, that the aqueous medium contains the resin in an amount of approximately 1.0 to 5.0% by weight, in particular approximately 1.5 to 3.5% by weight, the long-chained carboxylic acid in an amount of approximately 1.0 to 5.0% by weight, in particular approximately 1.5 to 3.0% by weight, the printing ink oil in an amount of approximately 0.7 to 7.0% by weight, in particular approximately 1.0 to 4.5% by weight, the aromatic compound in an amount of approximately 0.1 to 8.0% by weight, in particular approximately 0.5 to 6.0% by weight, and/or the polar organic solvent in an amount of approximately 1.0 to 20% by weight, in particular approximately 0.5 to 10% by weight.

Directly after completion of step a), step b) may follow to be performed in invention-specific manner. The aqueous suspension of the phthalocyanine crude blue obtained according to step a) is ground in an agitator ball mill without further essential measures to a suspension of a β-phthalocyanine blue pigment. The transformation of the phthalocyanine crude preferably takes place as "single-vessel" ("one-pot") process with parallel occurring steps of mechanical grinding by shear and impact forces, including transformation into the desired β-crystal structure modification with parallel occurring pigment conditioning in an agitator ball mill in an aqueous system. The agitator ball mill, which is a high energy mill, can beneficially be modified in the sense of optimized geometry, optimized filling ratio and viscosity of the grinding suspension for attainment of maximum performance combination. The peripheral velocity of the rotor of the agitator ball mill preferably ranges between approximately 4 to 18 m/s, in particular 9 to 14 m/s. Grinding beads of ceramic material or steel are preferably employed in the agitator ball mill. These beads preferably feature diameters in the range of approximately 0.2 to 1.5 mm, in particular approximately 0.5 to 1.0 mm. The degree-of filling the agitator ball mill with grinding beads lies appropriately at approximately 60 to 95 percent of volume, in particular at approximately 80 to 90 percent of volume. Step b) is preferably executed as a recirculation process. This is done in particular via a condenser vessel equipped with an effective stirring mechanism, which can also be used for production of the premix in step a), and an external pump. Step b) develops heat by itself.

It is deemed preferential that this step is performed at elevated temperatures, in particular at temperatures of approximately 30 to 95° C., with a range of approximately 45 to 70° C. being particularly preferred.

In order to further optimize the method, adjustment is made for a particularly beneficial grinding length (dwelling time of grinding product in the mill). That time may preferably vary between 4 and 35 minutes, in particular between approximately 12 and 25 minutes.

Steps a) and b) as explained above permit trouble-free solution of the problem on which task the present invention is based, within the scope of efforts of mere skilled craftsmanship, solving the task in a particularly beneficial manner by materializing the addressed preferred beneficial design features. The obtained inventive aqueous suspension can be transformed directly into a lipophile colored concentrate, in particular within the scope of a generally known flush-kneader method.

In addition, it is possible to directly isolate from the attained, inventive aqueous suspension the therein contained, already conditioned desired β-phthalocyanine blue pigment. For that purpose one may in general proceed by cooling the aqueous suspension, mill base or the aqueous grinding product to approximately under 40° C., with subsequent addition of diluted mineral acid under stirring, such as for example, sulfuric acid or hydrochloric acid with a concentration of 2-10% by weight, in order to adjust a pH value of approximately 2 to 6. The pigment suspension is then filtered in the usual manner, the filter cake is washed, first with tap water and after that with de-mineralized water, to neutral (6<pH <8) and salt-free (<200 micro S/cm) condition. After drying, the material is micronized to a powder.

The attainable benefits from the invention are many and were, overall, not to be expected in view of the assigned object. More specifically: Contrary to the technical instructions of the initially described state of the art, it is possible according to the invention, by means of wet grinding of phthalocyanine crude blue in the presence of small amounts of resins, long-chained carboxylic acids and printing ink oils, to directly produce a high quality product in that re-agglomeration of micronized particles is prevented during the grinding step. By subsequent "flushing" in a kneading apparatus of the aqueous suspension of phthalocyanine obtained in step b), the pigment particles transfer into the lipophile phase, so that the water separates. This aqueous phase can now simply be decanted. The remainder can be eliminated, under partial vacuum, by heating in the kneading apparatus. All ionic impurities are dissolved in water and automatically removed from the lipophile phase by decanting off the aqueous phase. The targeted combination of specific recipes with the respective appropriate beneficial parameters during the wet process permits to combine into one single step, in one single "reaction vessel" the traditionally customary individual (spatially and time-wise separated) steps, for mechanical comminution of the phthalocyanine crude blue and subsequent des-agglomeration, re-crystallization of primary particles including stabilization/conditioning (step b), in brief, a "one-pot-process".

The result is a β-phthalocyanine blue pigment which by its coloristic and other pigment-physical properties is performing superior to conventional commercial products known in particular for off-set printing ink applications. The β-phthalocyanine blue pigment is not required to be isolated, since incorporation into the matrix can be done without problem in the next step. Final treatment in a triple-roller-mill as a precaution device for elimination of any potentially existing oversize particles is thus rendered obsolete. If required, final de-gassing of the preparation may be done on the triple-roller mill.

It is considered a principal advantage of the inventive process that it permits production of a high-quality β-phthalocyanine blue pigment (C.I. PB 15:3) for application in off-set printing inks from a crude blue slurry by simple "wet milling" in a special grinding medium. In addition to the noteworthy economical and ecological benefits resulting from minimzed amounts of "lost" process auxiliaries, the following distinguishing beneficial characteristics should be pointed out:

The developing aqueous suspension is easier to handle in a plant process based on its pumpability. In addition, compared with traditional pigment press cakes, it can be produced at lower cost and is ecologically less damaging. The addressed finishing steps can be performed in a single vessel or "reactor", as a result of which subsequent expensive isolation and transport steps can be avoided. The achieved quality in the application medium is, moreover, superior to pigments and pigment preparations produced from conventional pigment press cakes and can also be produced more simply as far as the desired different application possibilities are concerned. The clear color shade of the process product is the result of addition of small amounts of above named additives, which cause the initially developing small imperfectly crystalline particles to optimally re-crystallize during grinding of the slurry of phthalocyanine and, at the same moment condition the re-crystallized pigment particles. It is of particular advantage in comparison with the traditional finishing method, that the quantity of charged ("β-directing") aromatic compounds in general only amounts to approximately 0.1 to 8% by weight in the suspension, whereas the traditional comparison methods require an excess of 50 to 600% by weight (!) of (also aromatic) solvents. Thus, according to the invention, an almost negligible percentage of auxiliary substances is needed, when compared with the state of the art method. According to the traditional method, a triple-roller mill is absolutely needed in order to eliminate over-size particles in printing ink concentrations. This can be avoided according to the invention. Degasification may also be carried out for example, in a simple vacuum chamber.

The economic benefit of the process may be emphasized by comparing with the state of the art methods, as it requires less time, and can be performed at comparatively low solvent expenditure. It is cheaper than the known grinding-/re-crystallization/conditioning methods or "salt grinding methods". Moreover, expenditure for production equipment is less when compared with traditional methods. This holds true in particular when compared against the conventional salt grinding method, since the invention does not require any such significant washing- or salt separating steps.

The lower expenditure for auxiliary substances results in an advantage with respect to storage purposes insofar as space requirements and process safety are concerned.

It was extremely surprising that the addressed small amounts of β-phase directing aromatic compounds in the inventive process suffice in order to transform the remaining portions of crude blue into β-blue crystals. Without intending to commit to this theory, it may be assumed that the reason is the combination with the additives which are employed in performing the inventive method in step a) and which in step b) in spatial proximity to crude blue are exposed to the effect of the agitator ball mill (in particular with high shear force and friction of a micromedia mill, combined with adequate heat effect (for example at approximately 30 to 95° C.)). In an effort to optimize the inventive method, it was ascertained that subsequent heating of the pigment, following grinding, during a period from 6 to 8 hours at 60 to 95° C., results in further improvement of the quality.

This measure should not be regarded as mandatory, but rather as an additional beneficial step in a single case in order to obtain further optimization for high performance applications.

The result is an excellent product according to the invention, which can be beneficially applied for the addressed application purposes. Excellent coloring and application-technique advantages of the obtained β-phthalocyanine blue pigment become particularly apparent in blue off-set printing inks.

The invention will be explained in more detail below, by means of examples. These examples are by no means limiting the invention or confine it to such procedural instances. All percentage data relate—unless specifically noted otherwise—to mass-%; in that context "100%" relates to the total starting material.

EXAMPLE 1

A homogeneous mixture produced by means of a dissolver, comprising 32.1% copper phthalocyanine crude blue, synthesized according to the phthalic-acid anhydride method, having a purity of 74%, 0.3% palmitic/stearic acid glyceride, 1.3% sodium hydroxide, 1.1% phenol-modified hydrocarbon resin, 4.3% oleic acid-sodium salt, 3.9% 2-methyl-1-propanol, 1.2% mineral oil "PKWF 4/7", 0.2% acenapthene and 55.6% water are placed into the condenser vessel of a laboratory high output agitator ball mill. The suspension is ground by recirculation method for 230 minutes. The peripheral speed of the rotor is 6.8 m/s. The grinding chamber of the mill is equipped at 76 volume % with zirconium-oxide beads (0.7-0.9 mm diameter) as grinding media. Temperature of the grinding process is 45 to 48° C.

Upon completion of procedure, the product is cooled to 20 to 25° C. and the pH value reduced to 5.5 by dilute (2%) sulfuric acid. Isolation of the β-phthalocyanine blue pigment is carried out by filtration through Buechner funnel or a filter press like subsequent washing of the filter cake by tap water and de-mineralized water until conductivity of 180 microS/cm is attained and pH 6.8.

The obtained pigment press cake is dried in the air circulation drying cabinet at 90° C. until weight is constant; the dried product is comminuted to powder by means of an impact mill.

As an alternative method, the fluidized grinding product ("mill base") is transformed to a "flush" in accordance with the description which follows:

1405 grams "mill base" are charged in a heatable twin shaft kneader device with sigma-shaped kneading tools (gross volume 2.7 liter; manufacturer: Lleal ). The pH value is adjusted to 6.8-7.2 with hydrochloric acid (5%). Subsequently, the following materials are added under kneading: 122.3 g phenol-modified hydrocarbon resin, 81.1 g phenol modified rosin ester, 137.0 g mineral oil "PKWF 4/7 af new" and 5.9 g tert.-butyl-hydroquinone. The kneading mass ("magma") is heated to 65° C. After the first so-called "break" sets in, the supernatant water is decanted. After that, another 612 g of the above manufactured pigment suspension is added under agitation.

Following adjustment of the pH-value to 6.2-6.6 with hydrochloric acid (5%) 13.9 g of monosulfonated copper phthalocyanine blue are added. The "magma" is kneaded at 65° C. until the second so-called "break" occurs. The supernatant water, is again decanted. By 3-time addition of tap water of 620 g each, (with the third addition comprising de-mineralized water instead), 30 minutes of kneading and removal of supernatant water, residual water-soluble, undesirable (for the final product) substances are dissolved from the pigment concentrate.

An addition of 128.6 g of mineral oil "PKWF 4/7 af new", 61.2 g hydrocarbon resin, 52.2 g linseed oil and 99.3 g alkyd resin, is followed by 45 minutes of kneading at 85° C.

After draining the last portions of water at 95° C. under reduced pressure, the pasty printing ink preparation is isolated.

EXAMPLE 2

Employed Mix Recipe:
  a 53.1% water
  b 1.3% sodium-hydroxide
  c 0.4% sodium dioctylsulfosuccinate
  d 1.8% phenol-modified hydrocarbon resin
  e 4.3% oleic acid
  f 1.2% mineral oil "PKWF 4/7 af New"
  g 0.2% trans-stilbene
  h 3.9% 2-methyl-1-propanol
  i 33.8% copper phthalocyanine crude synthesized according to the phthalic-anhydride method (purity 74%).

Pigment finish (step b)) and pigment isolation, or the alternative transformation into a flush are carried out in accordance with specifications of Example 1.

EXAMPLE 3

Premix production (step a)) and pigment isolation or alternative transformation into a flush are done in accordance with specifications of Example 1, while step b) (pigment finish) is carried out for 180 minutes with 8.9 m/s peripheral speed of the rotor of the agitator ball mill at mill base temperatures of 50 to 53° C.

EXAMPLE 4

Employed Mix Recipe:
- a 59.9% water
- b 1.3% sodium hydroxide
- c 0.4% glyceryl oleate
- d 1.8% phenol-modified hydrocarbon resin
- e 4.3% oleic acid
- f 2.2% mineral oil "PKWF 4/7 af new"
- g 0.2% trans-stilbene
- h 3.9% 2-methyl-1-propanol
- i 26.0% copper phthalocyanine crude synthesized according to the phthalonitrile method (purity 96%)

Step b) (pigment finish) is performed according to specifications of Example 3, while pigment isolation or the alternative transformation into a flush is done according to specifications of Example 1.

EXAMPLE 5

Employed Formulation:
- a 50.9% water
- b 1.3% sodium hydroxide
- c 0.6% alcohol-ethyl/propyl
- d 2.1% hydrated colophonium resin
- e 4.3% oleic acid
- f 1.2% mineral oil "PKWF 4/7 af new"
- g 0.2% trans-stilbene
- h 13.9% 2-methyl-1-propanol
- i 26.0% copper phthalocyanine crude synthesized according to the phthalonitrile method (purity 96%).

Step b) (pigment finish) is performed in accordance with specifications of Example 3, while pigment isolation of the alternative transformation into a flush is done in accordance with the specifications of Example 1.

EXAMPLE 6

Employed Formulation
- a 40.6% water
- b 1.3% sodium hydroxide
- c 0.4% tetramethyldecyndiol
- d 1.8% hydrated colophonium resin
- e 4.3% oleic acid
- f 1.2% mineral oil "PKWF 4/7 af New"
- g 0.2% 1,2,4,5-tetramethylbenzene
- h 3.9% 2-methyl-1-propanol
- i 46.3% aqueous copper phthalocyanine press cake, synthesized according to the phthalic anhydride method (solids content 63%).

Step b) (pigment finish) is performed in accordance with specifications for Example 3, while pigment isolation or the alternative transformation into a flush is carried out according to the specifications of Example 1.

EXAMPLE 7

Employed Formulation
- a 59.4% water
- b 1.3% sodium hydroxide
- c 0.6% sodiumdodecyl diphenyloxide-disulfonate
- d 3.1% phenol-modified colophonium resin
- e 4.3% oleic acid
- f 1.2% mineral oil "PKWF 4/7 af New"
- g 0.2% anthracene
- h 3.9% 2-methyl-1-propanol
- i 26.0% copper phthalocyanine crude, synthesized according to the Phthalic anhydride method (purity 98%)

Step b) (pigment finish) and also pigment isolation or alternative transformation into a flush are carried out in accordance with specifications of Example 1.

EXAMPLE 8

Premix production (step a)) is done according to Example 7. Pigment finishing (step b)) is effected in a time frame of 180 minutes with 8.9 m/s peripheral speed of the rotor of the agitator ball mill at mill base temperatures of 51 to 53° C. Isolation of pigment (step c) or the alternative transformation into a flush takes place in accordance with the course of action of Example 1.

EXAMPLE 9

Employed Formulation:
- a 58.3% water
- b 1.3% sodium hydroxide
- c 0.6% sodiumdodecyl-diphenyloxide disulfonate
- d 2.1% phenol-modified colophonium resin
- e 4.3% oleic acid
- f 1.2% mineral oil "PKWF 4/7"
- g 0.2% anthracene
- h 3.9% 2-propanol
- i 28.1% copper phthalocyanine crude, synthesized according to phthalic anhydride method (purity 94%)

Pigment finish step is performed in a time frame of 230 minutes at 8.9 m/s (peripheral speed of the agitator ball mill rotor) and at mill base temperatures between 50 and 53° C. For pigment isolation or alternative transformation into a flush, see Example 1.

EXAMPLE 10

Employed Formulation
- a 58.3% Water
- b 1.3% sodium hydroxide
- c 0.6% alcohol-ethyl/propyl
- d 2.1% phenol-modified colophonium resin
- e 4.3% oleic acid
- f 1.2% mineral oil "PKWF 4/7"
- g 0.2% anthracene
- h 3.9% 2-propanol
- i 28.1% copper phthalocyanine crude, synthesized according to phthalic anhydride method (purity 94%)

Pigment finishing step b) is performed in accordance with specifications of Example 9, with zirconium-oxide being substituted by steel shot (0.6 to 0.8 mm diameter) and grinding temperature set at 54 to 57° C. Pigment isolation or the alternative transformation into a flush is done in accordance with specifications of Example 1.

EXAMPLE 11

Employed Formulation
- a 58.3% water
- b 1.3% sodium hydroxide
- c 0.6% sodium dioctylsulfosuccinate
- d 2.1% hydrated colophonium resin
- e 4.3% oleic acid
- f 1.2% mineral oil "PKWF 4/7 af new"
- g 0.2% anthracene
- h 3.9% 2-propanol
- i 28.1 copper phthalocyanine crude, synthesized according to phthalic anhydride method (purity 95%)

Step b) (pigment finish) is performed in accordance with specifications of Example 10 at mill base temperatures of 54-57° C., while pigment isolation is undertaken as follows:

After the grinding suspension temperature has been cooled to 24° C., the pH value is lowered to 3.0 with hydrochloric acid (5%). Further measures are taken in accordance with specifications of Example 1.

The alternative transformation into a flush takes place according to Example 1.

EXAMPLE 12

Premix production (step a) is done in accordance with specifications of Example 10.

Step b) (pigment finish) is performed for 180 minutes with 11.4 m/s peripheral speed of the rotor of the agitator ball mill at grinding temperatures of 59 to 61° C. Pigment isolation or alternative transformation into a flush is done according to specifications of Example 1.

Comments concerning the above examples:

The intermediate product from step b) (=pigment finish) can be processed like a standard commercial aqueous pigment press cake directly into lipophile ink concentrates by means of a generally known flush process, in kneading machines which may operate either continuously or in batches, specifically into offset printing ink concentrates (flushes).

Benefit of the employed pigment suspensions (instead of pigment press cakes): Because of low viscosity, these can be pumped and processing is thus a lot easier.

Adjustment, for example, to a printing ink having a 12% pigmentation degree is achieved by incorporating the concentrate into an oil-based printing ink matrix over a time period of two hours by means of a "dissolver", at a peripheral speed of 5 m/s and a temperature of 65-70° C., this matrix comprising 29% low-molecular hydrocarbon resin, 8% high-molecular hydrocarbon resin, 6% colophonium resin, 38% mineral oil, 16% alkyd resin, 1% wax, 1% "anti-skinning agent" (2-tert.-butyl hydroquinone) and 1% zinc stearate.

The printing ink can be degassed / vent in one pass on a triple-roller mill. A magnetic separator is not required according to our experience, but can be integrated into the process. The said application results in extremely stable, greenish-blue printing inks of high color intensity and good yield, combined with good flow- and printing properties. The printed matter distinguishes itself in addition by outstanding transparency and excellent gloss. Color intensity and coloring effect are compared with competitors' products prepared with printing inks having the same 12% degree of pigmentation in that the resulting printing inks are applied on white cardboard after mixing same with a titanium dioxide-based white paste ("S-Viscous-White N 1305 TR"; made by Gebr. Schmidt) and then adjusted in a mixing apparatus (manufacturer Hauschild) to a color pigment contents of 1.9%. Evaluation as to coloring effects is done by measuring with a spectrophotometer at 45°/0°-D 65/10°.

The dry pigment isolated from the pigment suspension is pre-dispersed with four times the amount of pasting varnish in a universal mixing apparatus ("Ro-zet 12 E 0185-1"—by Gebr. Schmidt). The resulting paste, featuring a pigment content of 20% is rubbed out by plate-pasting machine and adjusted by homogenization with additional pasting varnish in a Hauschild-mixer to a pigment content of 12%. A polishing and venting pass on a triple-roller mill may complete the production of printing inks. Tests in accordance with above described methods produce similarly good results as obtained when using the flush process route in the production of printing ink (see above).

The invention claimed is:

1. A method for producing an aqueous suspension of β-phthalocyanine blue pigment, using an agitator ball mill, comprising:
   a) a phthalocyanine crude blue is suspended by means of a dissolver in an aqueous medium;
   b) the aqueous suspension of the phthalocyanine crude blue is ground and conditioned in an agitator ball mill to form a suspension of a β-phthalocyanine blue pigment; and,
   (c) a dispersing agent, a resin binder, a β-phase-directing aromatic compound, a printing ink oil, a polar solvent, and a base are incorporated into the aqueous suspension of the phthalocyanine crude blue.

2. The method according to claim 1, wherein the aqueous medium contains lipophile, binding agent resins, compatible with a final application medium, crystal phase-directing and/or pigment surface-conditioning compounds.

3. The method according to claim 1, wherein the binding agent resins, individually or totally are from about 0.1% to about 25% by weight, in the aqueous medium.

4. The method according to claim 2, wherein the aqueous medium further comprises carboxylic acids.

5. The method according to claim 1, wherein adding the polar solvent acts as a solutizer to the aqueous medium for promoting solubility.

6. The method according to one of claim 1, wherein step b) is executed at an elevated temperature of at least 30° C.

7. The method according to claim 6, wherein step b) is executed at a temperature from about 30° C. to about 95° C.

8. The method according to claim 1, wherein step b) is executed as a recirculation process, wherein an average dwelling time of a mill base in the agitator ball mill is from about 4 minutes to about 35 minutes.

9. The method according to claim 1, wherein a peripheral speed of a rotor of the agitator ball mill is from about 4 m/s to about 18 m/s.

10. The method according to claim 1, wherein grinding beads made of ceramic material or steel are employed in the agitator ball mill.

11. The method according to claim 10, wherein the grinding beads feature diameters from about 0.2 mm to about 1.5 mm.

12. The method according to claim 1, wherein a fill ratio of the agitator ball mill with grinding beads is from about 60% to about 95% volume.

13. The method according to claim 1, wherein the aqueous suspension comprises adjusted from about 15% to about 55% by weight of phthalocyanine crude blue pigment and from about 40% to about 60% by weight of water and the remainder comprising other components.

14. The method according to claim 1, wherein in the aqueous suspension the base is present in a concentration from about 0.3% to about 2.0% by weight and/or a dispersion auxiliary agent is present in a concentration from about 0.1% to about 0.9% by weight.

15. The method according to claim 1, further comprising: transforming the aqueous suspension of β-phthalocyanine blue pigment into a lipophile colored concentrate, wherein the transforming includes a flush-kneader method.

16. A method for producing an aqueous suspension of β-phthalocyanine blue pigment, using an agitator ball mill, comprising:
a) a phthalocyanine crude blue is suspended by means of a dissolver in an aqueous medium;
b) the aqueous suspension of the phthalocyanine crude blue is ground and conditioned in an agitator ball mill to form a suspension of a β-phthalocyanine blue pigment; and,
wherein a vessel for executing step a) and a storage reservoir for executing step b) can be identical and a change from step a) to step b) is limited to opening and closing of several valves including switching-on a circulating pump and a mill drive.

17. A method for producing an aqueous suspension of β-phthalocyanine blue pigment, using an agitator ball mill, comprising:
a) a phthalocyanine crude blue is suspended by means of a dissolver in an aqueous medium;
b) the aqueous suspension of the phthalocyanine crude blue is ground and conditioned in an agitator ball mill to form a suspension of a β-phthalocyanine blue pigment; and,
wherein the aqueous medium further comprises: binding substance resin present in a concentration from about 1.0% to about 5.0% by weight a carboxylic acid present in a concentration from about 1.0% to about 5.0% by weight, a printing ink oil present in a concentration from about 0.7% to about 7.0% by weight, an aromatic compound present in a concentration from about 0.1% to about 8.0% by weight, and a polar solvent present in a concentration from about 0.1% to about 20% by weight.

18. A method for producing an aqueous suspension of β-phthalocyanine blue pigment, using an agitator ball mill, comprising:
a) a phthalocyanine crude blue is suspended by means of a dissolver in an aqueous mediums, wherein the aqueous medium comprises:
a dispersion agent including at least one selected from the group consisting of: alcohol-ethyl/propyl, tetramethyldecyndiol, sodium dioctylsulfosuccinate, glyceryloleate, sodium dodecyl-diphenyloxide-disulfonate, ammonium polyacrylate, diethyleneglycolstearate, penta-erythrityloleate, diisopropyl-napthaline-sodium-sulfonate, PEG-glyceryloleate and/or palmitic/stearic acid-glyceride,
a binding agent resin including at least one selected from the group consisting of: phenol-modified hydrocarbon resin, alkyd resin, hydrocarbon resin, hydrated colophonium resin, phenol-modified colophonium resin, pentaervthritol-rosin ester, colophonium resin, phenol-modified rosin ester and maleic-modified rosin ester, ketone resin, aldehyde resin, melamine-formaldehyde-condensation resin and/or acrylic resin,
a carboxylic acid including at least one selected from the group consisting of: stearic acid, palmitic acid, oleic acid, dodecanoic acid, linoleic acid, linolenic acid and/or myristic acid,
beta-phase-directing aromatic compounds including at least one selected from the group consisting of dibenzofuran, 1.8-napthalimide, benzyl, diphenyl carbinol, 1-methylnaphthaline, phthalic acid anhydride, benzoic acid, benzophenone, trans-stilbene, 1,2,4,5-tetramethyl-benzene, anthracene, and dibenzyl ether,
a printing ink oil including at least one selected from the group consisting of various mineral oils and vegetable oils,
polar solvents including at least one selected from the group consisting of: cyclohexanol, dioxane, butyl glycol, amyl alcohol, dodecyl alcohol, acetone, 2-methyl-3-butene-2-ol, dimethylformamide, dimethylsulfoxide, 3-methyl-1-butanol, tetrahydrofurane, 2-propanol, 2-methyl-1-propanol and polyethylene glycol, and,
a base including at least one selected from the group consisting of: potassium hydroxide, sodium hydroxide, an aguenous ammonia solution, monoethanolamine and triethanolamine; and,
b) the aqueous suspension of the phthalocyanine crude blue is ground and conditioned in an agitator ball mill to form a suspension of a β-phthalocyanine blue pigment.

19. A method for producing an aqueous suspension of β-phthalocyanine blue pigment using an agitator ball mill, comprising:
(a) a crude phthalocyanine blue is suspended in an aqueous medium by means of a dissolver;
(b) the aqueous suspension of the crude phthalocyanine blue thus obtained is ground and conditioned at a temperature from about 30° C. to about 95° C. in the agitator ball mill, of which from about 60% to about 95% volume is filled with grinding beads, to obtain a suspension of a β-phthalocyanine blue pigment; and,
(c) a dispersing agent, a resin binder, a β-phase-directing aromatic compound, a printing ink oil, a polar solvent as a solutizer, and a base are incorporated into the aqueous suspension of the crude phthalocyanine blue.

20. The method according to claim 19, wherein the dispersing agent includes lipophilic binders and/or pigment surface-conditioning compounds are also incorporated into the aqueous suspension.

21. The method according to claim 19, wherein the dispersing agent is present in an amount from about 0.1 wt.% to about 25 wt.% in the aqueous suspension.

22. The method according to claim 19, wherein step (b) is conducted as a recirculation process, where an average hold time of the crude phthalocyanine blue being ground in the agitator ball mill is from about 4 minutes to about 35 minutes.

23. The method according to claim 19, further comprising a single container for carrying out step (a) and step (b), and wherein a changeover from step (a) to step (b) is limited to opening and closing of several valves and to a turning-on of a circulation pump and the agitator ball mill.

24. The method according to claim 19, further comprising a speed of a rotor of the agitator ball mill is from about 4 m/sec to about 18 m/sec.

25. The method according to claim 19, further comprising grinding beads of ceramic or steel in the agitator ball mill.

26. The method according to claim 25, wherein the grinding beads have a diameter from about 0.2 mm to about 1.5 mm.

27. The method according to claim 19, wherein the agitator ball mill is from about 80% to about 90% full of grinding beads.

28. The method according to claim 19, wherein the aqueous suspension is from about 15 wt.% to about 55 wt.% of crude phthalocyanine blue pigment, and from about 40 wt.% to about 60 wt.% of water, the remainder being other components.

29. The method according to claim 19, wherein the base is present in a concentration from about 0.3 wt.% to about 2.0 wt.% and the dispersing agent is present in a concentration from about 0.1 wt.% to about 0.9 wt.%.

30. The method according to claim 19, further comprising in the aqueous medium, the resin binder is present in a concentration from about 1.0 wt.% to about 5.0 wt.%, a long-chain carboxylic acid derivative is present in a concentration from about 1.0 wt.% to about 5.0 wt.%, the printing ink oil is present in a concentration from about 0.7 wt.% to about 7.0 wt.%, the aromatic compound is present in a concentration from about 0.5 wt.% to about 6.0 wt.%, and the polar solvent is present in a concentration from about 0.1 wt.% to about 20 wt.%.

31. The method according to claim 19, wherein the aqueous suspension comprises:
the dispersing agent including at least one selected from the group consisting of alcohol ethoxylate/propoxylate, tetramethyl decyndiol, dictyl sulfosuccinate Na salt, glyceryl oleate, sodium dodecyldiphenyl oxide disulfonate, ammonium polyacrylate, diethylene glycol stearate, pentaerythritol oleate, diisopropylnaphthaline sodium sulfonate, PEG-glyceryl oleate, and palmitic/stearic acid glyceride;
the resin binder including at least one selected from the group consisting of phenol-modified hydrocarbon resin, alkyd resin, hydrocarbon resin, hydrogenated colophonium resin, phenol-modified colophonium resin, pentaerythritol rosin ester, colophonium resin, phenol-modified rosin ester, and maleic-modified rosin ester, ketone resin, aldehyde resin, melamine- formaldehyde condensation resin, and acrylic resin;
a carboxylic acid including at least one selected from the group consisting of stearic acid, palmitic acid, oleic acid, dodecanoic acid, linoleic acid, linolenic acid, and/or myristic acid is used as the long-chain carboxylic acid;
the β-phase-directing aromatic compound including at least one selected from the group consisting of dibenzofuran, 1,8-naphthalimide, benzil, diphenylcarbinol, 1-methylnaphthaline, phthalic anhydride, benzoic acid, benzophenone, trans-stilbene, 1,2,4,5-tetramethylbenzene, anthracene, and d ibenzyl ether;
the printing ink oil including at least one selected from the group consisting of a mineral oil and a vegetable oil;
the polar solvent including at least one selected from the group consisting of cyclohexanol, dioxane, butyl glycol, amyl alcohol, dodecyl alcohol, acetone, 2-methyl-3-buten-2-ol, dimethylformamide, dimethyl sulfoxide, 3-methyl-1-butanol, tetrahydrofuran, 2-propanol, 2-methyl-1-propanol, and polyethylene glycol; and,
the base including at least one selected from the group consisting of potassium hydroxide, sodium hydroxide, an aqueous ammonia solution, monoethanolamine, and triethanolamine.

32. The method according to claim 19, further comprising:
directly converting the aqueous suspension of β-phthalocyanine blue pigment obtained into a lipophilic color concentrate.

33. The method according to claim 32, wherein the converting to the lipophilic color concentrate includes a flush-kneader process.

* * * * *